United States Patent
Fell

(10) Patent No.: US 8,069,944 B2
(45) Date of Patent: Dec. 6, 2011

(54) VEHICLE ENGINE MOUNT

(75) Inventor: Thomas Fell, Oberleichtersbach (DE)

(73) Assignee: Deere & Company, Moline, IL (US)

( * ) Notice: Subject to any disclaimer, the term of this patent is extended or adjusted under 35 U.S.C. 154(b) by 228 days.

(21) Appl. No.: 12/470,946

(22) Filed: May 22, 2009

(65) Prior Publication Data

US 2009/0308680 A1    Dec. 17, 2009

(30) Foreign Application Priority Data

Jun. 11, 2008    (DE) .......................... 10 2008 002 350

(51) Int. Cl.
*B60K 5/12*    (2006.01)
(52) U.S. Cl. ........................................ 180/299; 180/291
(58) Field of Classification Search .................. 180/299, 180/291, 311, 312
See application file for complete search history.

(56) References Cited

U.S. PATENT DOCUMENTS

| | | | | |
|---|---|---|---|---|
| 1,881,958 | A | * | 10/1932 | Peo .................................. 403/74 |
| 2,044,714 | A | * | 6/1936 | Trott ............................... 248/604 |
| 2,205,999 | A | | 6/1940 | Bartlett et al. |
| 2,311,303 | A | * | 2/1943 | Collins ......................... 180/291 |
| 3,633,856 | A | * | 1/1972 | Crews ........................... 248/582 |
| 4,067,524 | A | * | 1/1978 | Brinkmann .................... 248/544 |
| 6,029,765 | A | * | 2/2000 | Chou et al. .................... 180/292 |
| 6,085,858 | A | * | 7/2000 | Wakana et al. ............... 180/300 |
| 6,494,285 | B1 | * | 12/2002 | Williams |
| 7,185,723 | B2 | * | 3/2007 | Aoyama et al. .............. 180/68.4 |
| 2004/0020702 | A1 | * | 2/2004 | Oshima et al. |

FOREIGN PATENT DOCUMENTS

| | | | |
|---|---|---|---|
| DE | 1138328 | | 10/1962 |
| DE | 1455850 | * | 4/1972 |
| DE | 19802805 | * | 7/1999 |
| DE | 10148312 | * | 12/2002 |
| DE | 69815602 | * | 6/2003 |
| DE | 102006019264 | * | 10/2007 |
| WO | 9961272 | * | 12/1999 |

OTHER PUBLICATIONS

German Search Report (3 pages).*
European Search Report received Jun. 6, 2011 (5 pages).

* cited by examiner

*Primary Examiner* — Eric Culbreth

(57) ABSTRACT

The invention relates to an engine mount for mounting an engine on a frame of an agricultural or industrial utility vehicle. The frame has two spaced apart frame elements. Further components of the utility vehicle, such as a gearbox and/or a vehicle axle, can be attached to the frame elements. An outer portion of an engine housing forms a mounting structure through which the engine is mounted on the frame elements, so that no external forces are applied to the engine or to the engine housing. The engine is mounted on the two frame elements using only the mounting structure.

8 Claims, 5 Drawing Sheets

VEHICLE ENGINE MOUNT

FIELD OF THE INVENTION

The invention relates to an engine mount for mounting an engine on a frame of an agricultural or industrial utility vehicle.

BACKGROUND OF THE INVENTION

Engine suspension systems or engine mounting systems have been known in the prior art for a long time. For example, it is customary to mount an engine with vibration isolation or fixedly or rigidly on a load-bearing chassis of the vehicle. Such a chassis usually includes a left-hand frame half and a right-hand frame half which are connected to each other by a plurality of connecting elements. The frame structure is therefore rigid with respect to flexing and torsion. If the engine is mounted on the frame with vibration isolation, no external forces are generally applied to the engine.

Alternatively, what is referred to as a block design is known, which is generally used in high-performance tractors. Here, the engine is mounted as a load-bearing element between a front axle or a front axle supporting block and a gearbox or gearbox frame. In such an arrangement, the engine is therefore permanently integrated into the chassis. As a result, external forces which are applied to the engine during locomotion are, in particular, very high when the vehicle is travelling off road and/or is carrying out a task off road. In particular, if a field is being ploughed with a plough which is coupled to the agricultural tractor, the agricultural tractor is subject to large external forces which are also applied to the engine or to the engine housing.

SUMMARY OF THE INVENTION

Accordingly, an object of this invention is to provide an engine mount which prevents external forces from being applied to the engine or the engine housing.

This and other objects are achieved by the present invention, wherein the engine housing forms a mounting structure which projects from the engine housing and mounts to two frame elements of the vehicle frame, and wherein the engine is mounted to the frame elements only by the mounting structure.

The mounting structure may be an annular flange which surrounds a central region of the engine. The flange can be arranged concentrically to the longitudinal axis of the vehicle or to the longitudinal axis of the engine or in a plane which is arranged perpendicularly to the longitudinal axis of the crankshaft.

In other words, the engine is connected in a self-supporting but essentially rigid fashion to the two frame elements. This connection supports the weight of the engine and the mechanical torque generated by the engine, in relation to the frame. Such a means of mounting can be implemented by means of a cantilever connection, with, for example, a corresponding mounting structure which is comparable to a collar or a flange being formed on the flywheel side of the engine housing. With such a mounting structure, no forces and loads which are external and which act primarily on the chassis of the vehicle are applied to the engine or engine block, which forces can lead to flexural loading and torsional loading of the engine block. Owing to the fixed connection between the engine and the two frame elements, this also increases the torsional rigidity of the chassis or of the frame.

The mounting structure may be positioned at the front or flywheel end of the engine or at the rear or opposite end of the engine. Preferably, one end of the engine is supported by the mounting structure, and the other end of the engine is freely suspended. For this reason, the mounting structure is to be embodied in such a way that a tilting moment or torque of the engine can be supported.

Alternatively, the mounting structure may be an annular mounting structure positioned at or near a central region of the engine. To this extent, the engine can as a result be mounted centrally or in a balanced fashion on the two frame elements.

The mounting structure particularly preferably has a housing reinforcement which extends around the circumference or periphery of the engine housing. The housing reinforcement can be provided on the flywheel housing or on a region of the engine housing on which the flywheel is arranged. The housing reinforcement can be dimensioned in such a way that at least the weight of the engine and the torque which is generated by it as well as acceleration forces which usually occur when the vehicle is operating and which act on the engine can be supported or dissipated in relation to the frame elements. The housing reinforcement then extends, in particular, around the circumference or periphery of the engine housing if an essentially annular or rectangular housing reinforcement is provided in the sense of an enclosed structure on the outside of the engine.

According to one preferred embodiment, the mounting structure is designed to form a cantilever connection to the frame elements. Alternatively or additionally, the engine is suspended from the frame in a self-supporting fashion by means of the mounting structure.

The mounting structure can have a flange. Or, a flange part can be adapted to the mounting structure. The flange part can be mounted on a frame element. In other words, a flange part which forms the mounting structure of the engine and with which the engine can be mounted on the frame elements can be provided in one piece. The flange part can, for example, be provided on the cast engine block. Alternatively, a flange part with which the engine is mounted on a frame element can be adapted to the mounting structure of the engine.

The engine can be mounted between the two frame elements using the mounting structure. Such a spatial arrangement of the engine relative to the two frame elements is known, for example, from production John Deere 6000 Series tractors. In said series, the two frame elements extend continuously from the front axle to the gearbox or differential housing. Since the engine is mounted between the two frame elements, the frame can be made more rigid.

The mounting structure prevents external forces which act on the frame of the utility vehicle from being applied to the engine. Such forces may be produced from, for example, an implement which is coupled to the utility vehicle. This may be implemented, for example, using a cantilever suspension means for the engine as mentioned above.

The mounting structure is preferably embodied in such a way that it can be used to support the self weight of the engine, and a possible tilting moment acting as a result of this and/or the mechanical torque generated by the engine in relation to the frame.

A frame element preferably has an elongated load-bearing component which is preferably arranged parallel to the longitudinal direction of the vehicle. Such a frame element is used in production John Deere 6000 Series tractors.

The mounting structure or a flange part which is rigidly connected to the mounting structure can be rigidly mounted on a frame element. As a result, the engine is rigidly connected to the frame elements or to the frame of the vehicle. Possible vibrations or oscillations of the engine are transmitted directly to the frame of the vehicle according to this embodiment.

Alternatively, the mounting structure dampens vibrations and/or oscillations of the engine relative to the frame elements. This can be implemented by means of slot-shaped or elongate cutouts in flange parts or in the mounting structure.

In a particularly advantageous way, the number of components which are necessary to mount the engine can be reduced if the mounting structure is embodied so as to be integral in or on the engine housing. The engine is, as it were, directly connected to the frame elements or mounted thereon using the mounting structure.

DESCRIPTION OF THE PREFERRED EMBODIMENT

Figure 1:
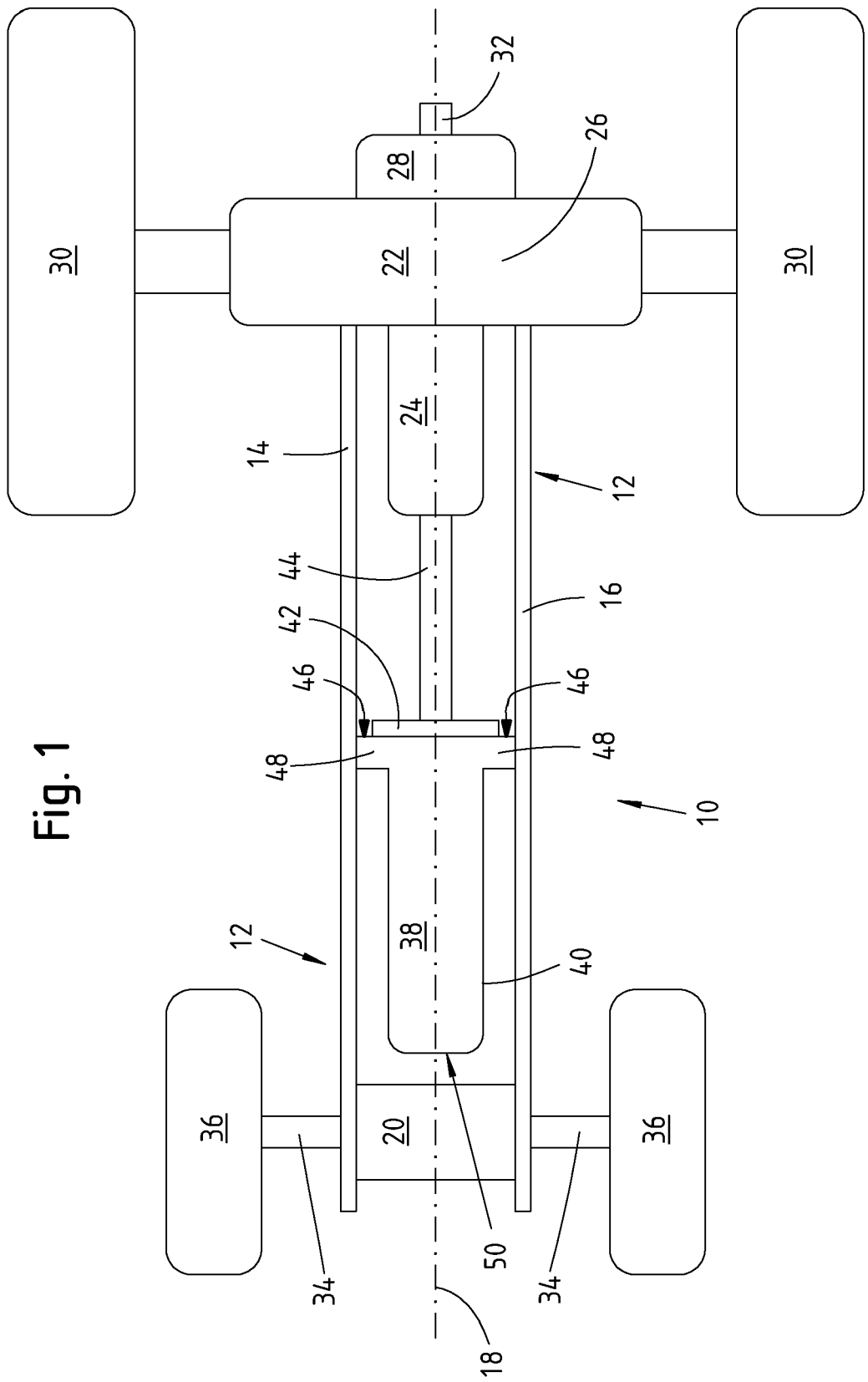
FIG. 1 is a top view of a first exemplary embodiment of the present invention.

FIG. 1 shows a chassis 10 of an agricultural utility vehicle, specifically of a tractor (not shown). The tractor has a frame 12 which has two spaced apart frame elements 14, 16 which extend from a front region of the tractor as far as a rear region of the tractor. The two frame elements 14, 16 are arranged essentially parallel to the longitudinal axis 18 of the vehicle. A connecting element 20, on which the two frame elements 14, 16 are respectively mounted, is provided in the front region of the tractor. The two frame elements 14, 16 are mounted to a gearbox housing 22 at a rear region of the tractor. The gearbox housing 22 is only shown schematically in FIG. 1 and comprises a power shift transmission 24, a differential gear 26 and a power take-off gear 28. The gear mechanisms are arranged approximately in the gearbox housing 22 which is composed of a plurality of housing parts. In each case the drive shafts (not shown) run from the differential gear 26 laterally via corresponding axle-mounted gearbox housings to the rear wheels 30 of the tractor in order to drive them. A power take-off 32 is rotationally connected to the power take-off gear 28, for driving implements (not shown) which can be attached to the tractor.

A front axle 34, which has pendulum bearings and is only indicated schematically, of the tractor is suspended from the connecting element 20. The front wheels 36 are rotatably mounted on the front axle 34. The engine 38 of the tractor is mounted on the frame 12 or on the frame elements 14, 16, with the engine 38 being an internal combustion engine. The engine 38 has an engine housing 40, a flywheel 42 and a drive shaft 44. The drive shaft 44 is connected to the power shift transmission 24 via a cardan shaft (not shown).

According to the invention, a side or outer portion 46 of the engine housing 40 forms a mounting structure 48 of the engine 38. The engine 38 is, in an inventive way, mounted on the two frame elements 14, 16 using only this mounting structure 48. To this extent, in particular the front region 50 of the engine 38 is not connected to a mounting component or to the frame 12 and/or the frame elements 14, 16 in any other way, that is to say it is mounted on the frame in a self-supporting fashion.

The outer portion 46 of the engine housing 40 in FIG. 1 is near the end of the engine 38 on which the flywheel 42 is arranged. In other words, the outer portion 46 of the engine housing 40 is the end of the engine 38 which faces the gearbox housing 22 or the power shift transmission 24.

In one alternative exemplary embodiment (not shown), the mounting structure 48, which is formed on the flywheel side of the engine housing 40 in FIG. 1, can be formed at the front region 50 of the engine 38. According to this exemplary embodiment, the engine 38 would accordingly be mounted on the two frame elements 14, 16 at the front region 50 of the engine 38 using just one mounting structure.

According to the exemplary embodiment in FIG. 1, the mounting structure 48 extends essentially perpendicularly to the longitudinal axis of the crankshaft (not shown) or of the drive shaft 44 or of the longitudinal axis 18 of the tractor.

The mounting structure 48 reinforces the engine housing near the flywheel 42 of the engine 38. According to the exemplary embodiment in FIG. 1, the mounting structure 48 is integral or in one piece with the engine housing 40. The mounting structure 48 extends around the circumference or periphery of the flywheel 42 or of the engine housing 40 in the region of the flywheel 42. Accordingly, the mounting structure 48 is embodied in such a way that it forms, with the frame elements 14, 16, a cantilever connection. The engine 38 according to FIG. 1 is suspended from the frame 12 or the frame elements 14, 16 in a self-supporting fashion using the mounting structure 48.

Because the engine 38 is mounted on the two frame elements 14, 16 using the mounting structure 48, the frame 12 of the tractor is additionally made more rigid. The frame 12 of the tractor comprises, in particular, the frame elements 14, 16, the connecting element 20 and the part of the gearbox housing 22 on which the frame elements 14, 16 are mounted.

The mounting structure 48 prevents external forces which can act on the frame 12 of the tractor from being applied to the engine 38. The engine 38 is in fact rigidly mounted on the two frame elements 14, 16 using the mounting structure 48. However, if the frame 12 is subjected to flexural loading or torsional loading and as a result the frame 12 is deformed in its three-dimensional structure, this is not applied to the engine 38 and the engine 38 is not deformed as a result of this. The engine housing therefore does not have to be designed to provide a load-bearing function for the vehicle. This allows costs to be reduced since the engine housing does not have to have the stability which would otherwise be necessary for an engine of the abovementioned block design.

The mounting structure 48 supports the weight of the engine 38 and the torque generated by the engine 38 on the frame 12 or on the frame elements 14, 16. A tilting moment or torque of the engine 38 which acts owing to the engine suspension and is caused by the weight of the engine 38 is also supported by the mounting structure 48. Acceleration forces of the tractor which possibly occur, act in the vertical and/or horizontal direction and can occur despite a possibly provided axle suspension system, in particular when heavy field work is being performed, are also supported or absorbed by the mounting structure 48 with respect to the frame 12.

Figure 2:
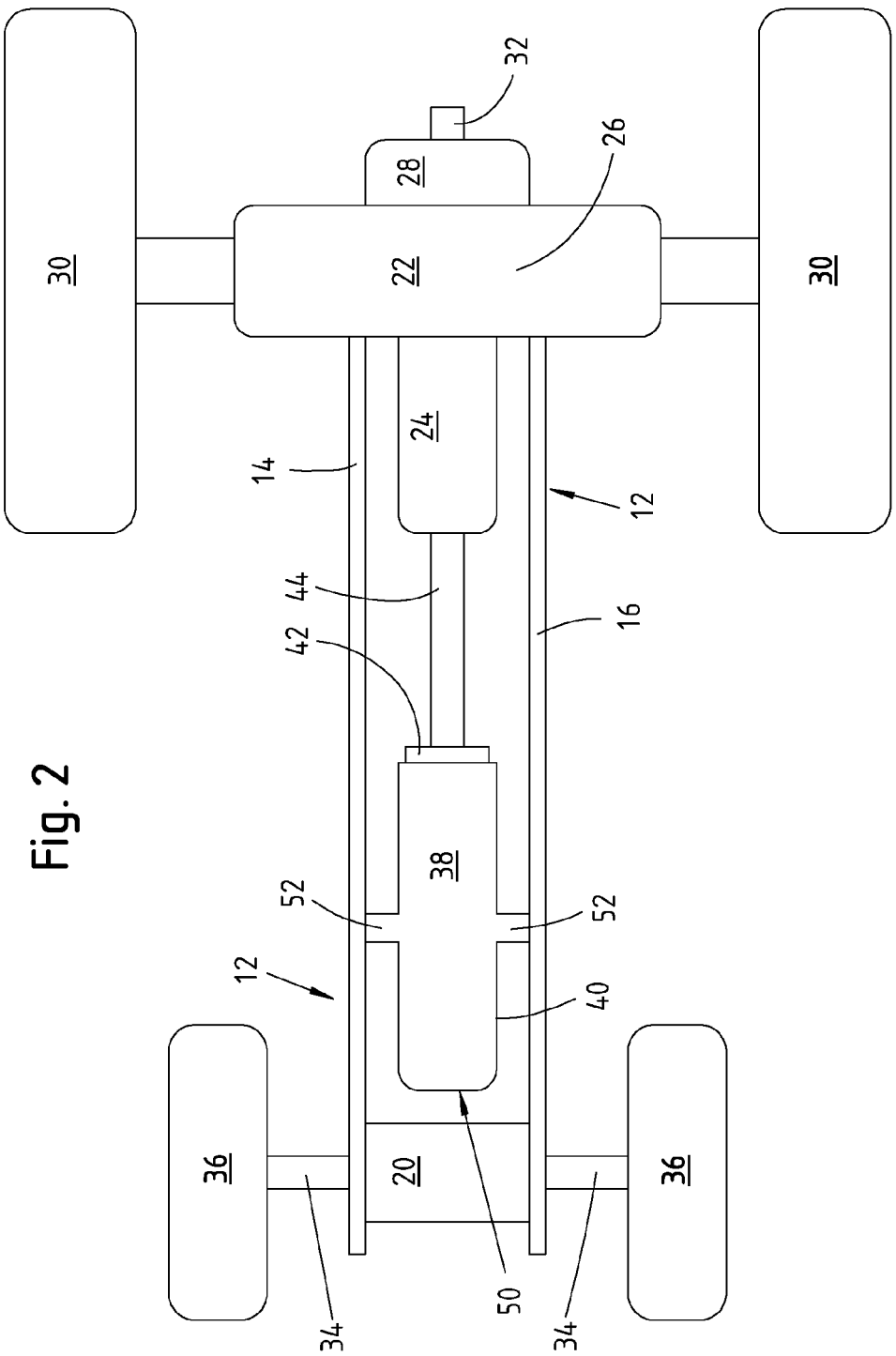
FIG. 2 is a top view of a second exemplary embodiment of the present invention.

FIG. 2 shows an alternative embodiment in which the frame 12 and the components attached thereto are embodied in a way comparable to the exemplary embodiment in FIG. 1. However, in this embodiment, there is no fastening structure formed on the flywheel side of the engine housing 40, but rather a mounting structure 52 is formed in a central region of the engine housing 40 on each side of the engine housing 40 which faces the frame elements 14, 16. Accordingly, the engine is mounted on the frame element 14 using the one fastening structure 52. The engine is mounted on the frame element 16 using the other fastening structure 52. The two fastening structures 52 from FIG. 2 therefore extend only in a central region of that respective side of the engine housing 40 which faces the respective frame element 14, 16. In the plan view in FIG. 2 it is not apparent that in this exemplary embodiment a housing reinforcement is provided on the underside of the engine 38 so that the mounting structure 52 from FIG. 2 is embodied essentially in a U shape, that is to say extends essentially vertically on the side facing the frame element 14, and also extends essentially vertically on that side of the engine housing 40 which faces the frame element 16. The two mounting structures 52 are connected underneath the engine 38 to form a further housing reinforcement (not shown).

Figure 3:
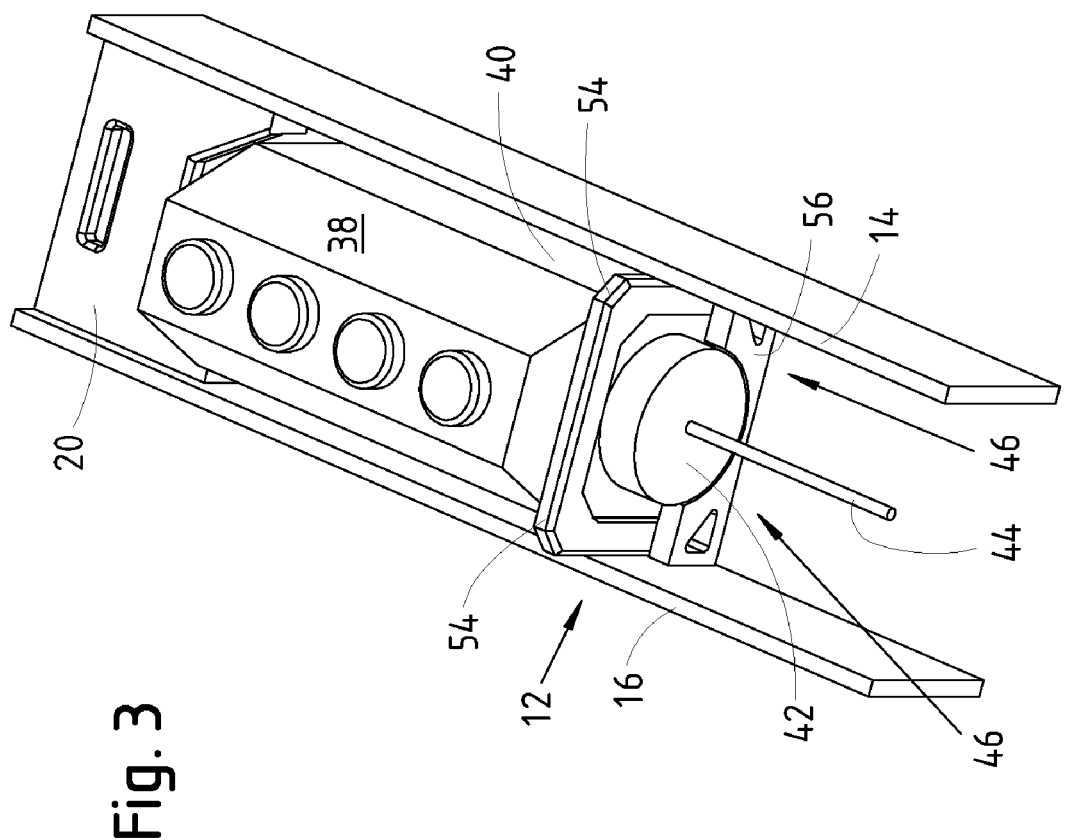
FIG. 3 is a perspective view of a further exemplary embodiment of the present invention.
Figure 4:
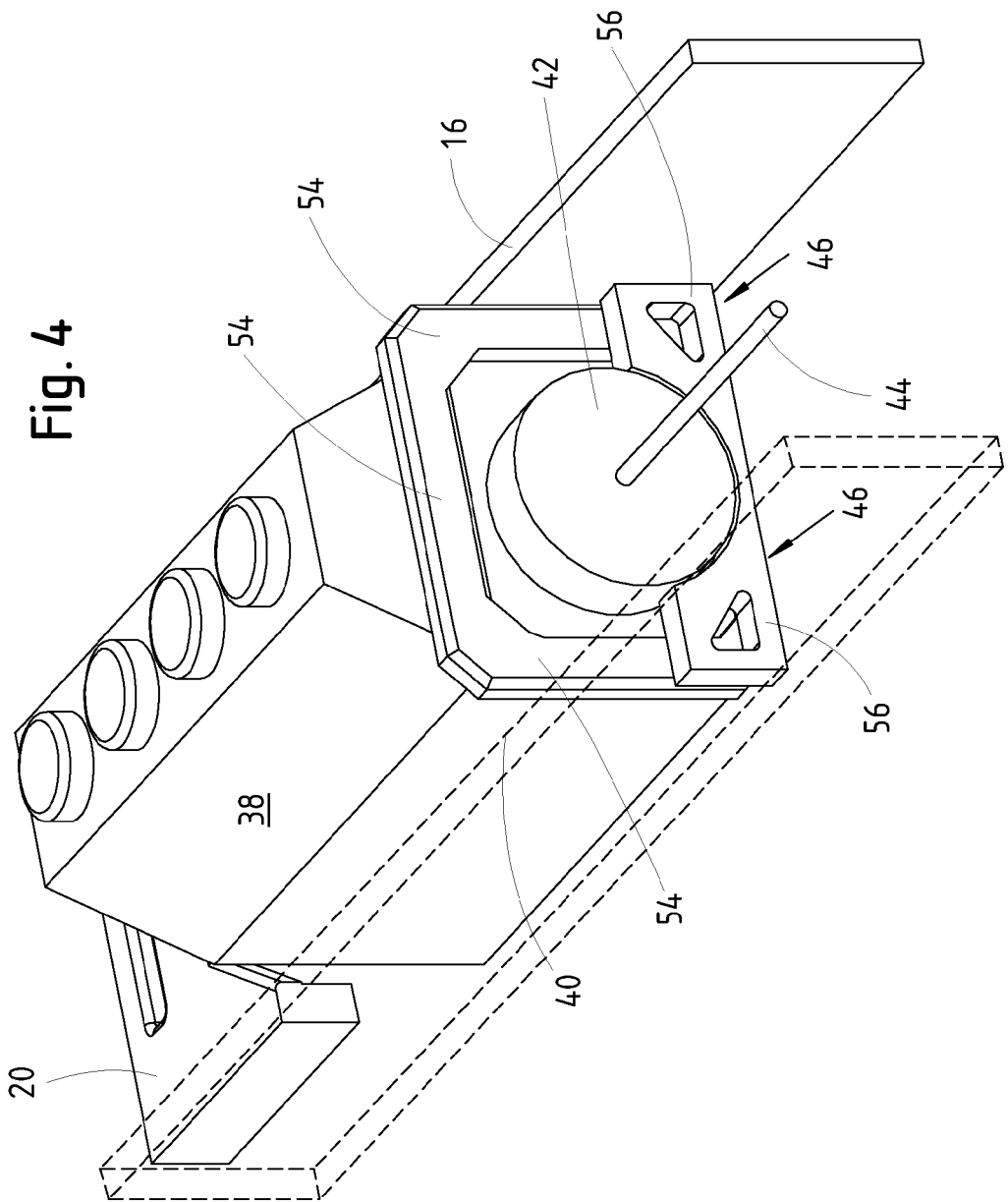
FIG. 4 is a perspective view of the embodiment in FIG. 3, viewed from a different perspective.

FIGS. 3 and 4 each show a further exemplary embodiment wherein only the upper part or region of the engine housing 40 is embodied in the form of a mounting structure 54. The mounting structure 54 is provided in the region of the flywheel 42. The mounting structure 54 is embodied in the form of a housing reinforcement. The engine housing 40 or the engine 38 is rigidly connected to the two frame elements 14, 16 using the mounting structure 54. In a lower region of the outer portion 46 of the engine 38, the engine housing 40 has a flange part (not shown) which is also embodied in the form of a housing reinforcement. A connecting element 56, which is rigidly connected to the frame elements 14, 16, extends between the two frame elements 14, 16. The flange part of the engine housing 40 is connected by flanges or is mounted on the connecting element 56. To this extent, the flange part of the engine housing 40 is rigidly mounted on the frame elements 14 and 16 via the connecting element 56. For reasons of clarity, the frame element 40 has been shown by dashes in FIG. 4.

Figure 5:
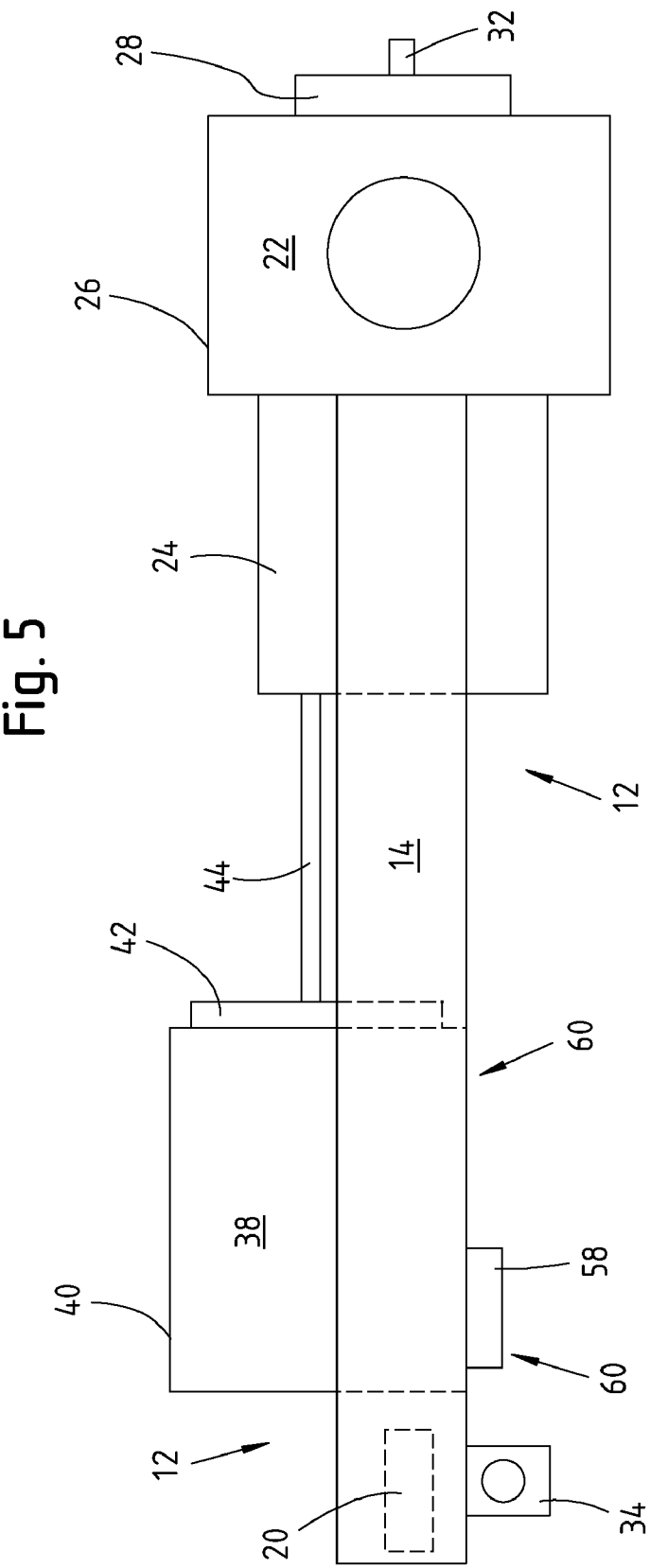
FIG. 5 is a side view of a further exemplary embodiment of the present invention.

FIG. 5 shows a further embodiment of an engine mount for the engine 38 on the frame 12. this embodiment includes two frame elements 14, 16 which are arranged spaced apart from one another, the connecting element 20 and the gearbox housing 22, which form the frame 12 of the tractor. In this exemplary embodiment, the front region of the lower side face of the engine housing 40 is embodied in such a way that as a result a mounting structure 58 of the engine 38 is formed. The engine 38 is mounted on the two frame elements 14, 16 using just this mounting structure 58. Specifically, the oil sump of the engine 38 or of the engine housing 40 is provided with a housing reinforcement which serves at the same time as a mounting structure for mounting the engine on the frame elements 14, 16. Accordingly, the underside of the engine housing 40, specifically the side face of the engine housing 40 which is indicated by the arrows 60, is arranged essentially in a horizontally oriented plane. The side face 60 of the engine housing 40 is therefore arranged essentially parallel to the longitudinal axis of the drive shaft 44 or to the longitudinal axis of the crankshaft (not shown) of the engine 38. The mounting structure 58 can then be connected directly to the two frame elements 14, 16. Alternatively, a flange can be formed on the mounting structure 58 and in turn a further flange part (not shown in FIG. 5) is rigidly attached thereto. This further flange part can be provided on either side and be rigidly connected to the respective frame element 14 or 16.

While the present invention has been described in conjunction with a specific embodiment, it is understood that many alternatives, modifications and variations will be apparent to those skilled in the art in light of the foregoing description. Accordingly, this invention is intended to embrace all such alternatives, modifications and variations which fall within the spirit and scope of the appended claims.

I claim:

1. An engine mount for mounting an engine on a frame of a vehicle, the frame having a pair of frame elements which are spaced apart from each other, and the frame elements supporting further vehicle components, characterized in that:
   the engine includes a housing, an outer portion of the housing forming an engine mounting structure, the mounting structure engaging the frame elements, and the engine is mounted to the two frame elements only through said mounting structure, mounting structure comprising a single bracket extending between both frame members, and only a single part of the engine is mounted to said single bracket.

2. The engine mount of claim 1, wherein:
the mounting structure is positioned at a front or rear end of the engine.

3. The engine mount of claim 1, wherein:
the mounting structure extends substantially perpendicularly to a longitudinal axis of a crankshaft of the engine.

4. The engine mount of claim 1, wherein:
the mounting structure forms a bottom surface which faces vertically downward.

5. The engine mount of claim 1, wherein:
the mounting structure forms a cantilever connection to the frame elements.

6. The engine mount of claim 1, wherein:
the mounting structure comprises a flange part which can be mounted on the frame elements.

7. The engine mount of claim 1, wherein:
the mounting structure isolates the engine from external forces which act on the frame.

8. The engine mount of claim 1, wherein:
the mounting structure is formed integrally with the engine housing.

* * * * *